Dec. 9, 1958 S. HENIG 2,863,574
MAIL SEPARATOR
Filed Sept. 23, 1957 9 Sheets-Sheet 1

INVENTOR
Seymour Henig
BY Arthur Vinograd
Leonard F. Stoll
ATTORNEYS

Dec. 9, 1958 S. HENIG 2,863,574
MAIL SEPARATOR
Filed Sept. 23, 1957 9 Sheets-Sheet 2

INVENTOR
Seymour Henig
BY Arthur Vinograd
Leonard F. Stoll
ATTORNEYS

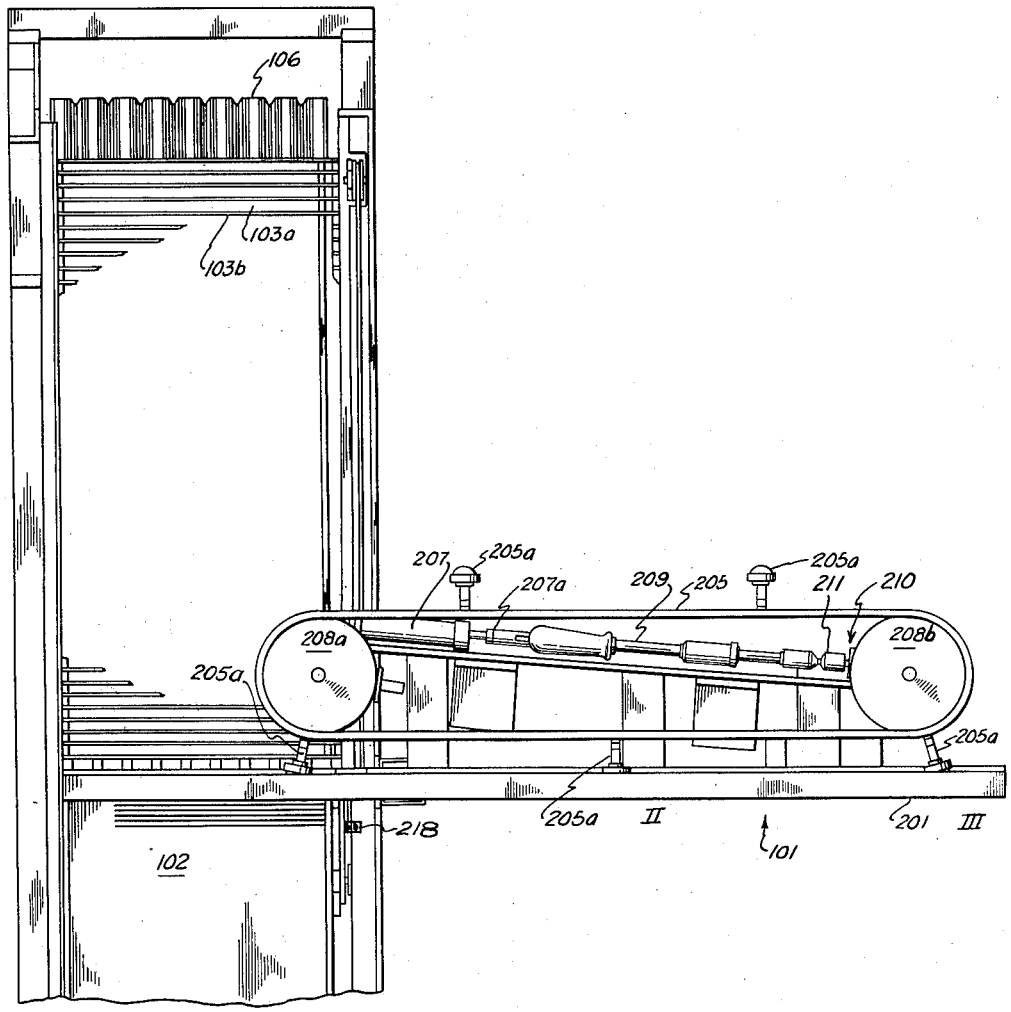
Fig. 2B
INVENTOR
Seymour Henig
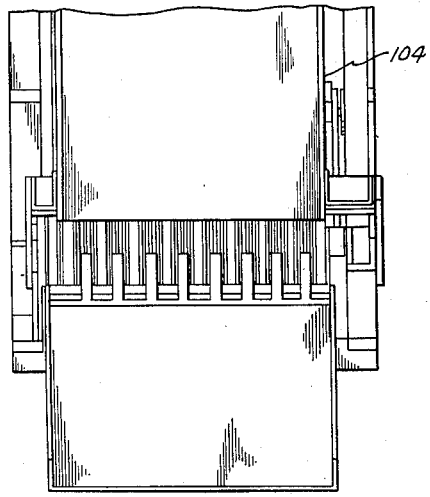

Dec. 9, 1958 S. HENIG 2,863,574
MAIL SEPARATOR
Filed Sept. 23, 1957 9 Sheets-Sheet 4

INVENTOR
Seymour Henig
BY Arthur Vinograd
Leonard F. Stoll
ATTORNEYS

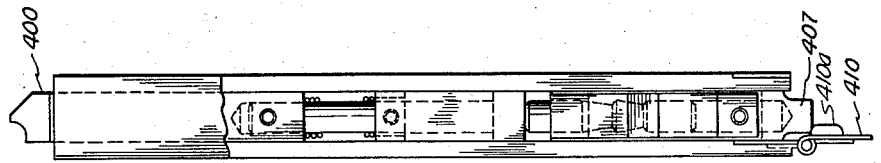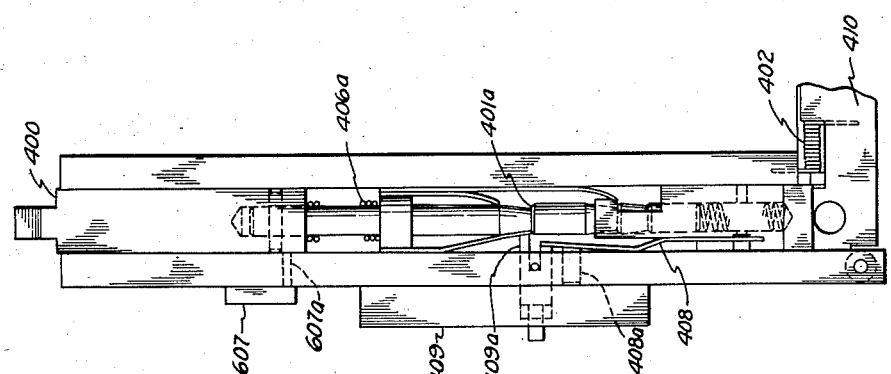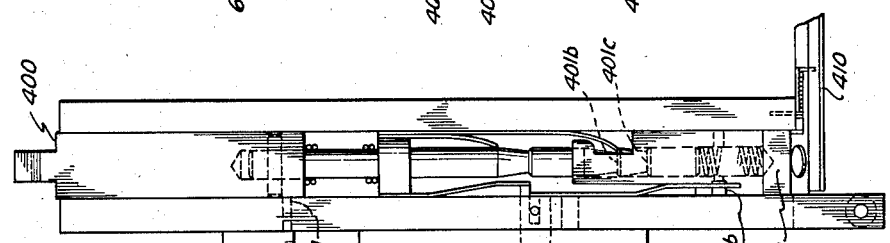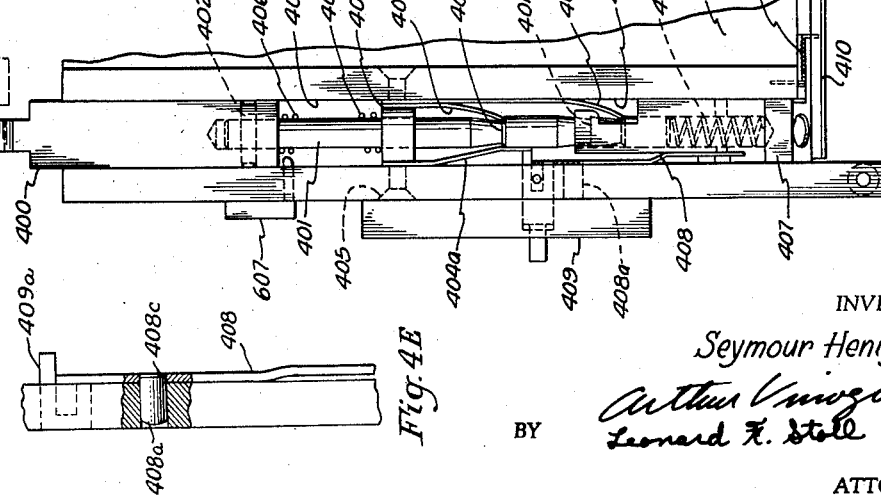

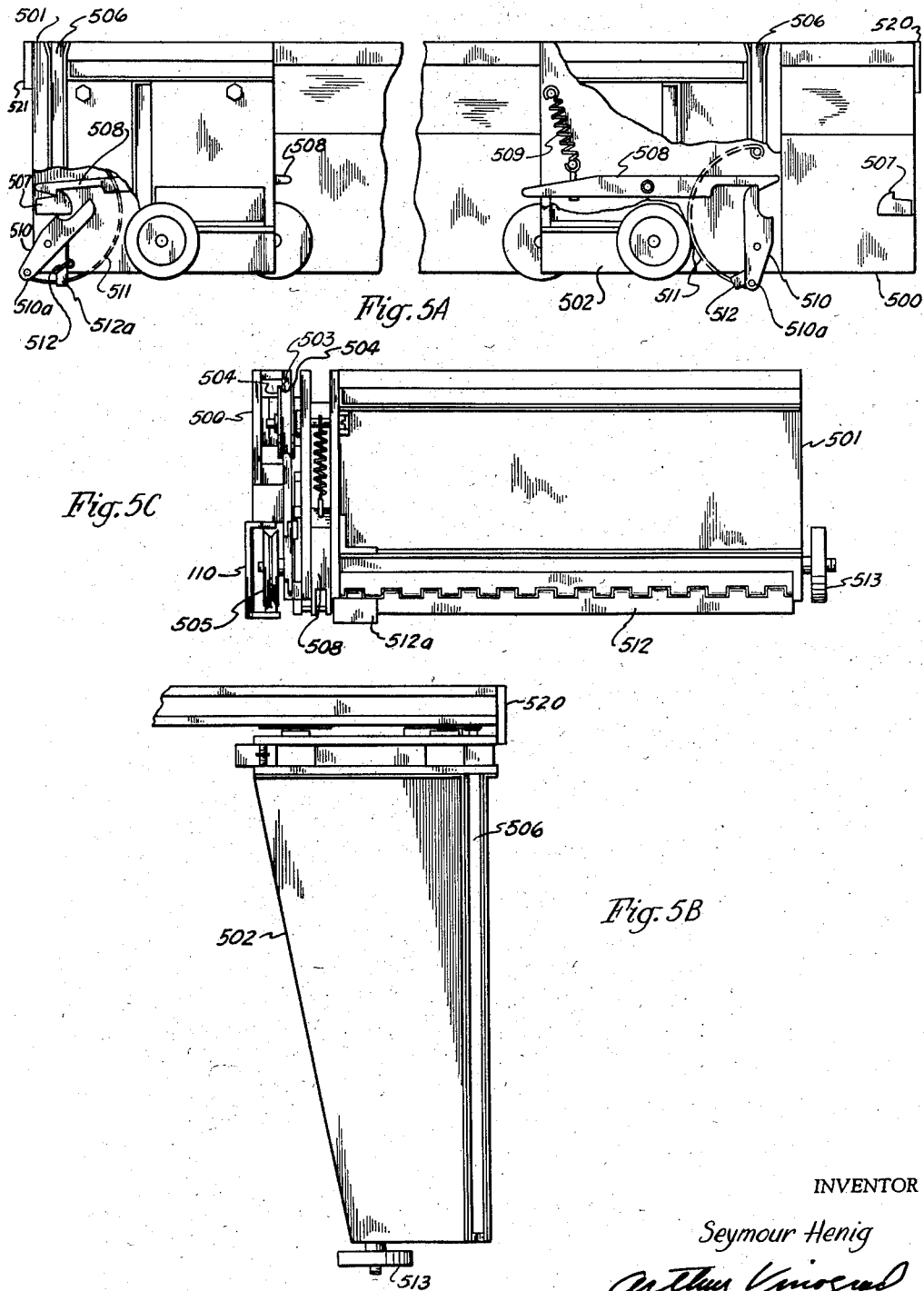

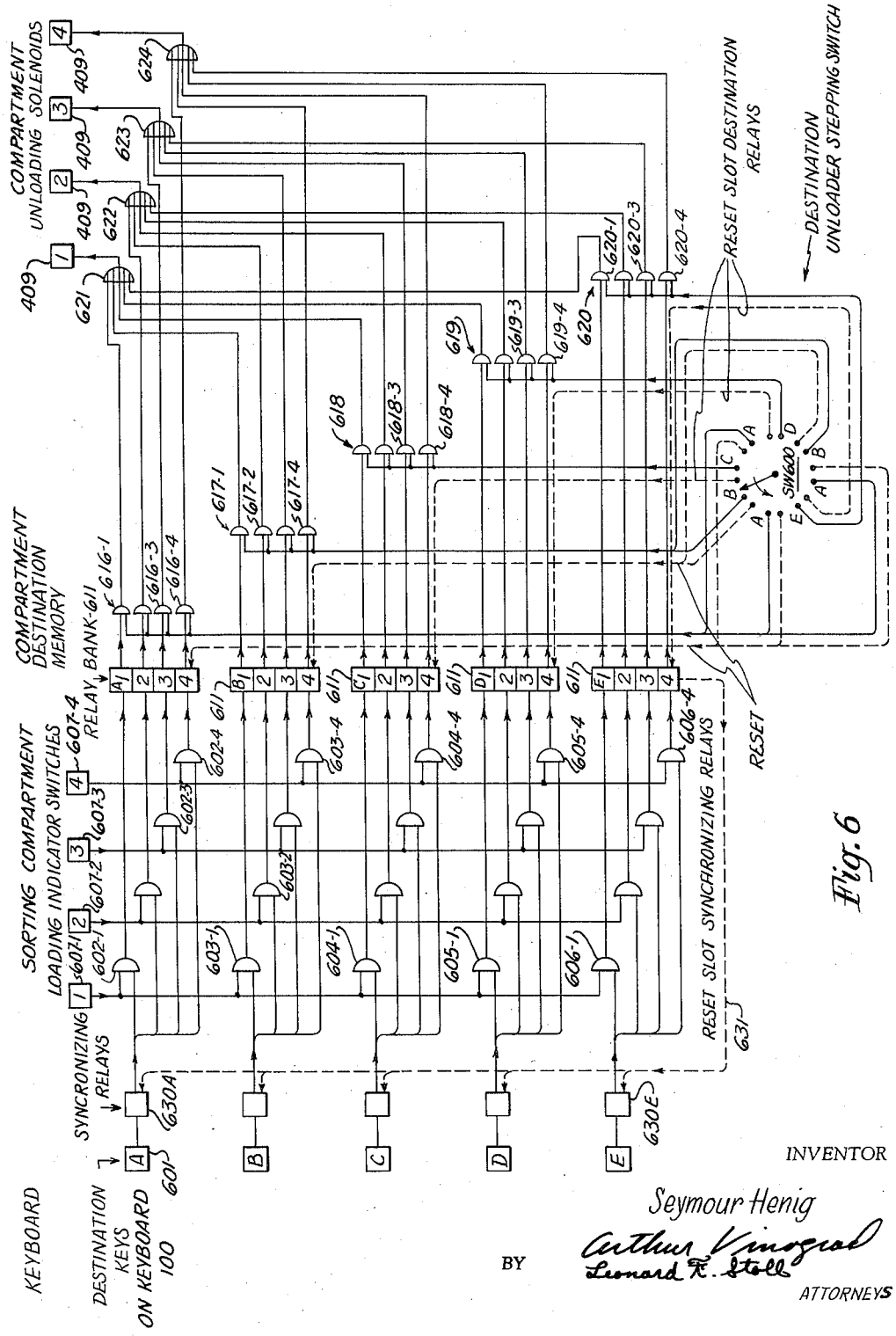

Dec. 9, 1958  S. HENIG  2,863,574
MAIL SEPARATOR
Filed Sept. 23, 1957  9 Sheets-Sheet 8

INVENTOR
Seymour Henig
Arthur Vinograd
BY Leonard F. Stoll
ATTORNEYS

Dec. 9, 1958 S. HENIG 2,863,574
MAIL SEPARATOR
Filed Sept. 23, 1957 9 Sheets-Sheet 9
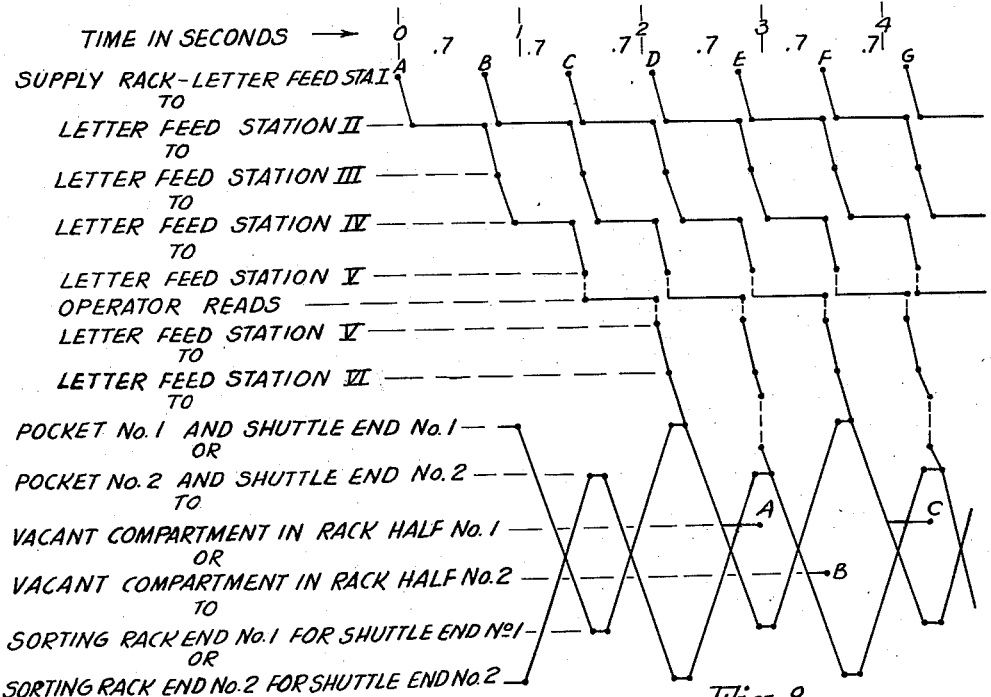
Fig. 8
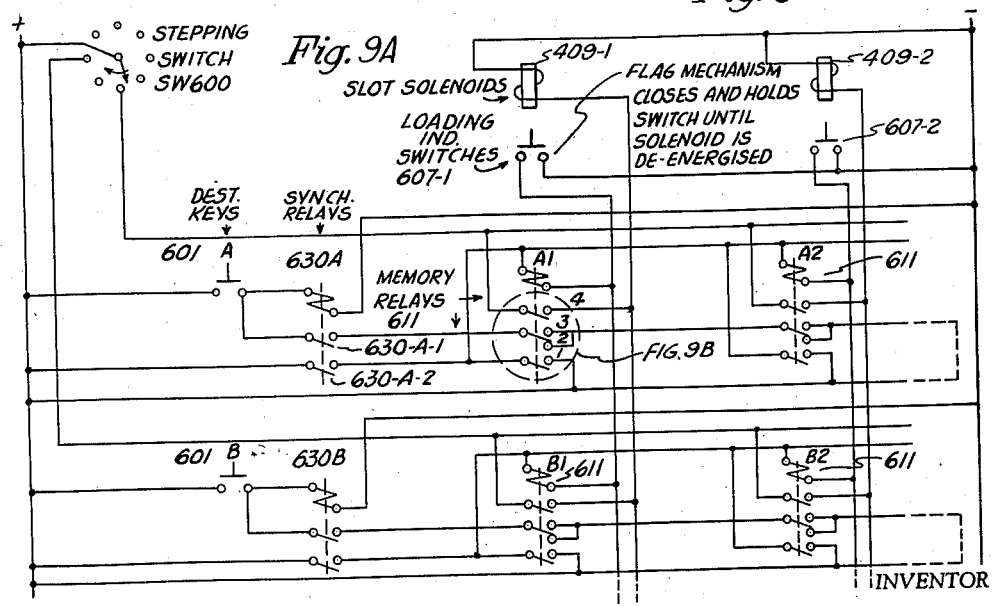
Fig. 9A
Fig. 9B
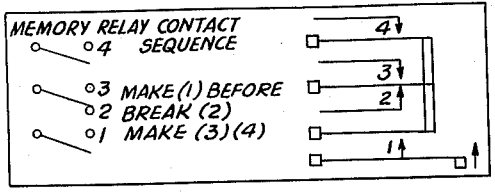
INVENTOR
Seymour Henig
Arthur Vinograd
Leonard F. Stoll
BY
ATTORNEYS United States Patent Office 2,863,574
Patented Dec. 9, 1958

2,863,574

MAIL SEPARATOR

Seymour Henig, Kensington, Md., assignor to the United States of America as represented by the Secretary of Commerce Application September 23, 1957, Serial No. 685,767

23 Claims. (Cl. 214—11)

This invention relates to material processing systems and particularly contemplates an improved mechanism for the rapid sorting and collection of articles according to predetermined groupings. The apparatus according to this invention is particularly suitable for the sorting of mail but the principles are applicable for article or information sorting as will become apparent as the description proceeds.

Existing mechanical sorting systems such as are described for example in the Gourdon U. S. Patents Nos. 2,669,365 and 2,751,092 are extremely complex and involve costly and bulky installations. The present invention, on the other hand, has been designed to employ a minimum of mechanical operating components and to permit wide flexibility of use.

In accordance with the principles of the present invention, a plurality of sorting or article storage compartments are employed each of which is adapted to receive only one article to be sorted during a cycle of operation. A feature of the invention is that these compartments have no fixed address but are labeled with the identification characteristics such as the address of a letter deposited therein. By means of an address-memory system of a type analogous to those commonly employed in data-processing systems, the particular labeled identity of a compartment into which an article is deposited, together with identification or address of the article so deposited therein are registered as separate bits of information in a storage or memory register. In this manner, a series of compartments are each separately filled in order with articles which may have common or different identifying characteristics such as postal destination addresses. When articles or letters corresponding to a predetermined destination are desired, means are provided for correlating a programming signal with the stored destination to produce discharge of all articles or letters having a corresponding destination. Since each sorting compartment is initially unidentified prior to depositing an article therein, it will be apparent that only a relative few receptacles need be provided to cover a wide range of destinations, and further, the number of destinations which can be handled is unlimited and is automatically determined by the address of a letter deposited therein.

It is accordingly an immediate object of the present invention to provide a sorting system in which a unit having relatively few sorting compartments can be employed to handle a wide variety of sorting procedures, the system being continuously and automatically adjustable in accordance with the characteristics of the articles being processed.

Another object of this invention is to provide a sorting system for use in mail handling and the like which is relatively simple in construction, compact, and economical.

It is a further object of this invention to provide a sorting system which is singularly adaptable for use in connection with a rapid electronic type of memory program control system.

An additional object of this invention is to provide a sorting system in which a relatively few sorting compartments can handle an unlimited number of destination points.

A still further object of this invention is to provide a sorting system in which the sorting compartments are automatically labeled in accordance with a destination point consonant with the letter or article deposited therein.

Fig. 1 is a pictorial representation of a typical installation of the apparatus of the present invention showing a plurality of individual sorting mechanisms arranged to discharge sorted articles on a common conveyor;

Figs. 2A, 2B, and 2C are views of the letter feed mechanism employed at each sorting station;

Figs. 3A, 3B, and 3C show the construction of a shuttle mechanism employed for transferring an article from the operator position to the sorting compartments;

Figs. 4A–4D are detailed views of the mechanism forming part of the sorting compartments of the present invention showing the sequence of operations involved in transferring an article from the shuttle to a sorting compartment and from the compartment to the conveyor;

Fig. 4E is an enlarged view of a portion of the structure shown in Figs. 4A–4D;

Figs. 5A–5C are various views of a modified type of shuttle;

Fig. 6 is a logical circuit diagram showing the control mechanism involved in the sorting of articles;

Fig. 8 is a timing diagram illustrating the sequence of operations involved in the sorting of articles, and Figs. 9A, 9B show a modification of the control circuit of Fig. 6.

Figure 1:
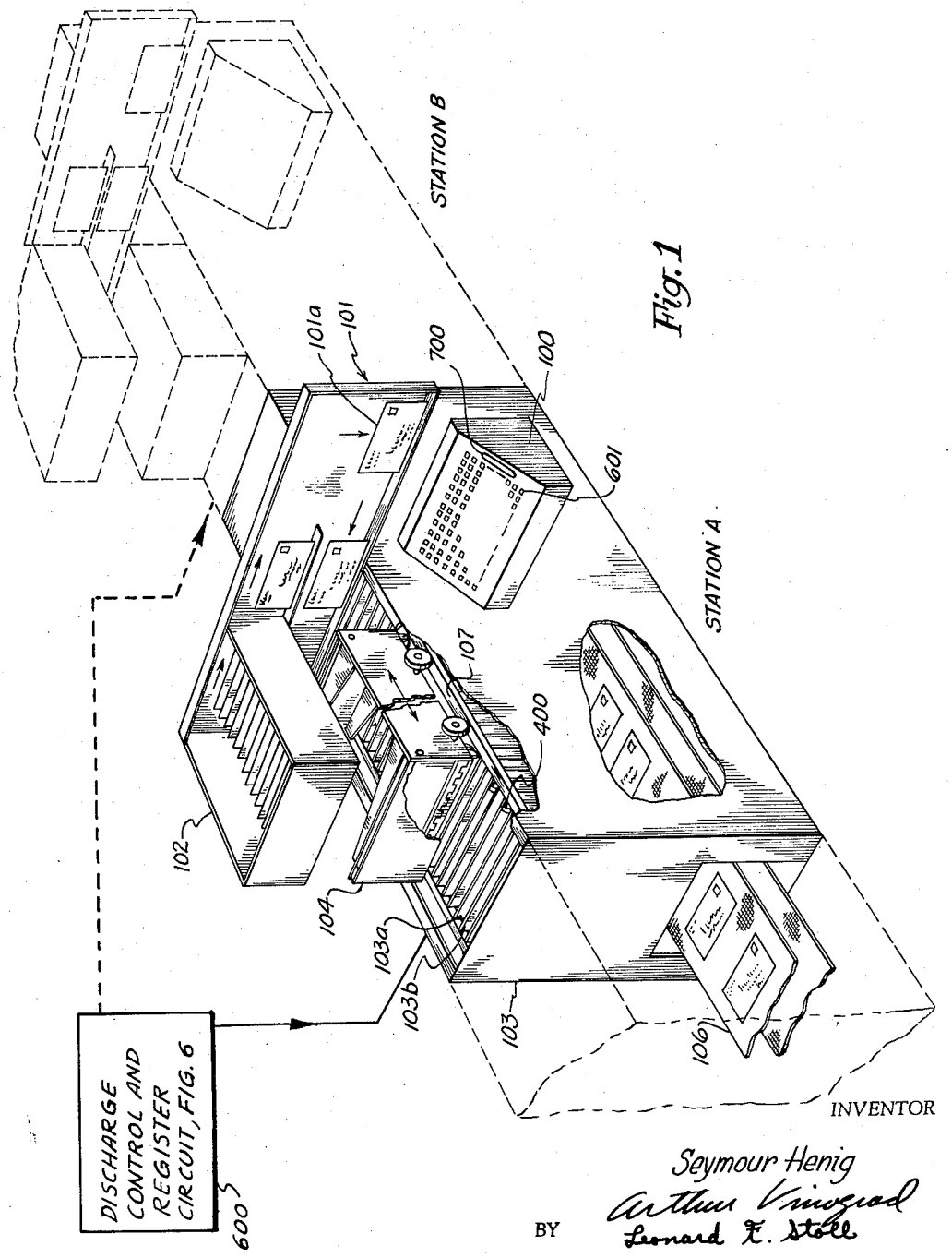

Fig. 1 illustrates the general arrangement of a sorting mechanism constructed in accordance with the principles of the present invention. Fig. 1 shows two sorting mechanisms labeled as stations "A" and "B" respectively for purposes of illustration. It will be apparent that the number of sorting stations employed in a particular installation is determined by the volume of sorting to be accomplished. Discharge of letters from each sorting mechanism can be controlled from a central programming device. A description of the construction and operation of any selected station will therefore explain the principal characteristics of the present invention.

Sorting station A comprises a keyboard control mechanism 100 and a letter feeder and inspection mechanism 101. Both the keyboard and letter feeder mechanisms comprise means which, under selective control of an operator at the sorting station, withdraws an article such as a letter from a supply source 102 and places it in a position in which it can be viewed by an operator. The address or other identifying characteristics appearing on the letter or article is translated into coded form by depressing appropriate ones of the keys on the keyboard 100. For example, if the particular sorting assignment calls for the sorting of letters according to geographically located "State" designations, there will be obtained a signal "State" address for each letter perused by the operator. An actuator key 700 is also provided on the keyboard and is depressed when a key selection is made. The actuator key initiates the letter feed indexing and shuttle operation mechanism. A conventional Teletype or Flexowriter mechanism modified for the purposes of registering geographical locations may also be employed for such purpose. As is well known such mechanisms provide signal patterns representing in binary coded form the information inserted by depression of a key on the keyboard. The keys may therefore be readily made to represent different geographical locations instead of alphabetical characters and number digits.

Each sorting station also includes a receptacle 103 which may preferably consist of an elongated bin divided by partions 103b into a convenient number of sorting or article storing compartments 103a. A shuttle 104 is slidably mounted on the receptacle 103 and is adapted to be reciprocated in a direction indicated by the arrows in Fig. 1 so as to traverse all of the sorting compartments.

As will be described in greater detail, the operator initiates a sorting operation by selecting an appropriate one of the address keys on the keyboard 100 and also depressing the actuator key 700. The effect of the latter is to initiate an article indexing cycle to produce the following control effects: (1) The letter to be sorted is indexed to a position over either end of the shuttle 104; (2) the letter drops into a pocket provided on either end of the shuttle; (3) the shuttle traverses the row of article storing compartments 103a and deposits the letter in the first vacant compartment encountered; concurrently subsequent letters are advanced along the rails of the display panel of the letter feeder.

Means are provided for transferring letters from the shuttle 104 to the first vacant compartment 103a in the receptacle 103. In this manner, letters, regardless of their addresses, are serially deposited in each vacant compartment in the receptacle 103 until all of the compartments are filled. The identity of each compartment is readily defined by its progressive physical position in the receptacle 103. For example, in a 20-compartment receptacle, the position or location of each article storing compartment may be defined by the order it occupies relative to one end of the receptacle.

By means to be described in greater detail as the description proceeds, information regarding the identity of each occupied sorting compartment 103a together with the designation address of the particular letter occupying such slot may readily be memorized in a storage register. By correlating such information in a manner to be described, the compartment location of a letter having a particular destination address can readily be determined.

The bottom of each sorting compartment 103a is provided with a discharge door (410, Fig. 4A). The discharge doors may be selectively actuated to letter discharge position by any convenient mechanical operating means such as, for example an energizable solenoid connected to each of the discharge doors, as will be described in connection with Fig. 4. The energization means for such solenoids are articulated with the referred-to information storage registers (Fig. 6) as will be described, in a manner such that the registers, when triggered by a destination-address programming signal will energize only those of the solenoids, corresponding to the particular destination interrogated by a programming signal. The letters discharged in response to actuation of the selected solenoids, are immediately deposited en masse on conveyor 106 and the letters so segregated according to destination are carried away as destination groups ready for transmittal to corresponding geographical areas.

As a particular example, assume that a receptacle 103 having 20 sorting compartments 103a is provided at each station. Further assume that the first twenty letters obtained from supply rack 102 have the following destination addresses: 10 letters for New York, 5 letters for Illinois, and 5 letters for California. Further, assume that the initial random arrangement of such letters will result in the following distribution of letters in the sorting compartments 103a:

New York: compartments 1, 3, 5, 7, 10, 11, 12, 15, 17 and 18
Illinois: compartments 2, 8, 9, 14 and 20
Calif.: compartments 4, 6, 13, 16 and 19

When all of the 20 slots have been filled according to the above pattern, the programming control will for example, first energize the discharge relays corresponding to those of the above compartments containing the New York destination, after which the relays for the Illinois compartments will be energized and finally those for the California addresses. Accordingly, the New York letters will first be discharged on to the conveyor 106, followed by the Illinois group etc. It will be clear that discharge can be effected at any time before the capacity of the receptacle is reached and that it is not necessary to completely empty all of the compartments 103a of the receptacle before continuing sorting. For example, the distribution of the mail may be such that a large volume of letters are intended for a particular single destination with occasional addresses to different, diverse locations. In this event the programming means can be arranged to discharge only the large volume destination letters at frequent intervals, and to discharge the remaining letters intermittently as the load conditions demand. Such flexibility of operation characterizing the present invention permits the use of a relatively small and compact unit in connection with the sorting of subject matter of extremely diverse classification.

The various components which comprise the above-outlined system will now be described in detail.

*Letter Feed* (Fig. 2).—The letter feed mechanism comprises the portion of the apparatus generally designated as the operator's station 101 in Fig. 1. The letter feed mechanism is detailed in Figs. 2A, 2B, and 2C and provides a means for sequentially feeding letters individually from the supply hopper 102 for visual inspection by the operator stationed at each of the sorting stations and thence to the sorting mechanism. Under control of the operator, a letter is fed from hopper 102, translated into a first inspection position 101a of the feed mechanism 101 and then to the shuttle 104.

Figures 2A, 2C:
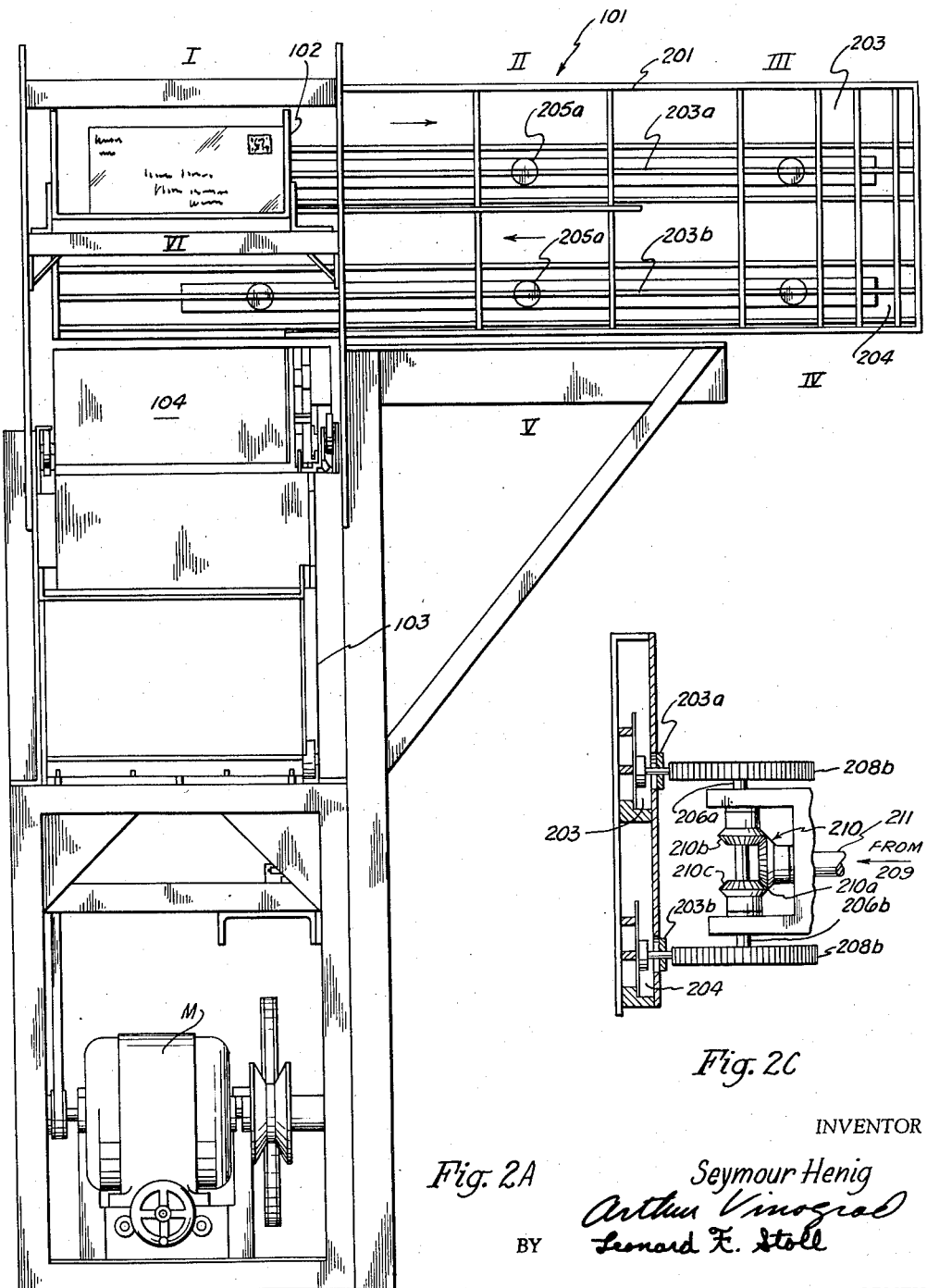

As indicated in Figs. 1 and 2, the letters are deposited in a stack or pile in the horizontally-arranged hopper 102. As is clearly shown in Figs. 1 and 2, the hopper 102 is mounted above the sorting rack 103 and the shuttle 104 is reciprocated across the top of the sorting compartments. The letter feed mechanism further includes a display panel 201 comprising a double trackway having an upper channel 203 and a lower channel 204 as indicated in Fig. 2A. By means to be described, a letter is initially translated from the storage hopper 102 along the upper track 203 to the right as viewed in Fig. 2A and then is carried back in a reverse direction along the lower track 204 to a position juxtaposed to the shuttle 104.

The means for translating the letters in sequential fashion are illustrated in Fig. 2B which is a top or plan view of the mechanism of Fig. 2A. The letter translating mechanism comprises a pair of continuous belts 205 only the upper one of which is seen in Fig. 2B. Each belt is provided with a plurality of article engaging fingers 205a mounted at spaced, predetermined intervals lengthwise of each belt 205. The spacing between the fingers is preferably such, that when three of the fingers are in a forward or active position in relation to the track (Fig. 2A), the remaining two fingers are at the rear of the track (Fig. 2B).

Each of the belts 205 are mounted medially with respect to the upper track 203 and the lower track 204 respectively, so that the fingers 205a project through respective slots 203a, 203b provided in the track as is clearly shown in Figs. 2A and 2C. The relation between the fingers 205 and the track as is clearly shown in Fig. 2B, is such that a finger 205 when in a position identified in the drawings by Roman numeral I adjacent the hopper 102, will wipe off a foremost one of the letter from the hopper 102. As the belt continues to travel in a counterclockwise direction as viewed in Fig. 2B, the letter picked off from the hopper will be translated to a position identified by Roman numeral II. When the letter is in the latter position, a subsequent one of the fingers 205 will then be in a position (I) to wipe off the next letter from the hopper. Further movement of the belt translates the first-mentioned letter to position III, in which position the finger 205a will be disengaged from the letter, allowing it to fall to the lower track 204. Such position is identified by numeral IV in Fig. 2A. At station IV the letter is engaged by a finger 205a on the lower belt and is translated to the left as viewed in Fig. 2 along the lower track 204 to position V. Position V corresponds to the operator's inspection station (designated as 101a in Fig. 1) and is so located with respect to the operator to permit rapid visual inspection of the address. The operator then registers the coded address of the letter by means of the keyboard 100, Fig. 1 and the letter is then translated to position VI where it is released by the finger 205a and dropped into a pocket in the shuttle 104.

The belts 205 are indexed to the various referred-to station positions by mechanism controlled by the operator in a manner such that, actuation of the keyboard by the operator consequent to registering the address of a letter, will cause movement of the belts a distance corresponding to the spacing between the respective positions. One type of drive mechanism satisfactory for accomplishing such purpose is shown in Fig. 2B. Each of the belts 205 is mounted on a pair of rollers 208a, 208b (Fig. 2B).

As indicated in Fig. 2C, an upper and lower roller 208b is linked by a reverse-gear connection comprising a pinion 210a adapted to drive gears 210b, 210c in opposite direction. The pinion 210a is driven by a shaft 211 coupled by means of a coupling or adaptor 211 as indicated in Fig. 2B. An air cylinder 207 provides the necessary power for actuating a screwdriver mechanism 209.

The air cylinder 207 is solenoid controlled as will be described in connection with Fig. 7, the solenoid being energized by a signal initiated by the actuator key 700 on the keyboard mechanism 100. It will be apparent from the above description that the air cylinder 207, during a forward stroke will actuate the screwdriver and gear assembly, to index the rollers 208b and thereby advance the belts 205 a distance corresponding to the spacing between stations I and II or II and III etc.

Fig. 2A also shows the drive motor M which operates the conveyor belt 106. Since such conveying mechanism is conventional, no further description thereof is considered necessary.

It will be apparent that various modifications of the particular exemplary type of letter feed mechanism illustrated in Figs. 2A–2C can be employed without departing from the principles of the present invention. Specifically, for limited installations, the operator could be positioned directly in front of the supply hopper 102 in which instance the front of the hopper would correspond to observing position I. In such event transfer of a letter to the shuttle 104 would be accomplished in a single indexing movement.

Figures 3A, 3B:
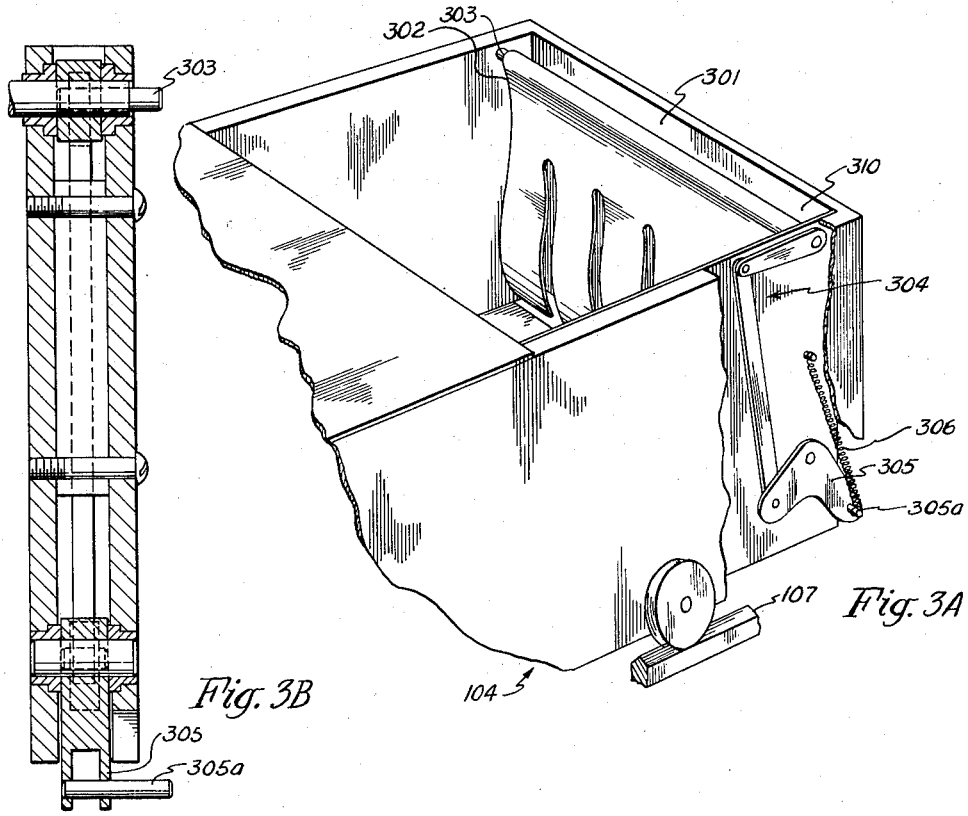
Figure 3C:
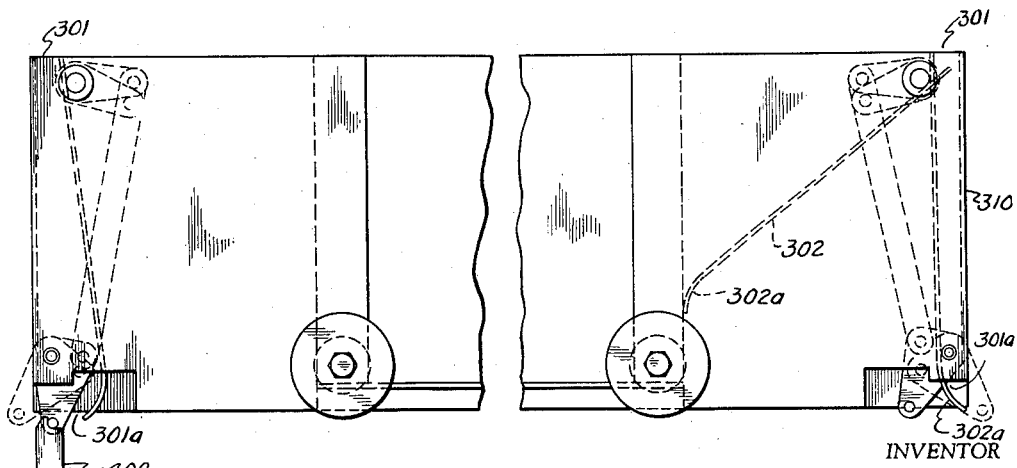

*Description of shuttle 104.*—The construction of one form of the shuttle 104 is detailed in Figs. 3A to 3C of the drawing. The length of the shuttle 104 is preferably made one-half the length of the sorting compartment rack 103 (see Fig. 1). The shuttle 104 is in the form of a carriage slidably mounted on tracks 107 provided on the upper portion of the rack 103 as clearly indicated in Fig. 1. The shuttle is provided with a letter-carrying pocket 301 at each end as is apparent in Figs. 3A and 3C. The relation between the length of the shuttle 104 and the length of the rack of sorting compartments 103 is such that when one of the pockets 301 in one end of the shuttle registers with position VI of the letter-feed station (see Fig. 2A), the other pocket will be at one end of the rack of compartments in the collecting bin 103. The letter-feed panel is located medially with respect to the length of the sorting rack 103. Because of such relationships the shuttle need be displaced a distance corresponding to only one-half the length of the sorting rack, all of the compartments 103a being surveilled by either one of the pockets 301 in the shuttle.

Each pocket 301 as seen in Fig. 3A comprises a pivoted partition 302 the free edge 302a of which is normally biased against an end wall 310 of the shuttle. The bottom surface of the shuttle is provided with a discharge slot 301a as indicated in Fig. 3C. The pivoted partition 302 is mounted on a shaft 303 which is provided with an operating linkage 304 (Fig. 3A) including a bell crank 305 connected to an overthrow spring 306. The lower end of the partition 302a is curved, and forms a closure with respect to slot opening 301a. A space between the end wall 310 and partition defines the referred-to pocket 301 for receiving letters or articles from the letter-feed mechanism. The letters are thereby retained by the lower edge 302a of the partition.

The position of the bell crank 305 is such as shown in Fig. 3A that the partition is in a letter holding position when the bell crank is rotated counterclockwise. It will therefore be apparent from Fig. 3A that rotation of the bell crank 305 in a clockwise direction will rotate the shaft 303 and displace the partition 302 to the position indicated in broken lines in Fig. 3C. Accordingly a letter will be discharged through slot 301a into an appropriate one of the sorting compartments 103a (Fig. 1) as will be described.

Actuation of the partition 302 into such letter-discharge position is obtained through the cojoint action of the shuttle 104 and a flag mechanism associated with each of the sorting compartments 103a.

Specifically, as shown in Figs. 4A through 4D, each of the compartments 103a in the sorting compartment rack 103 is provided with a flag 400 which may be in the form of a retractable plunger as will be described. The flags are serially arranged in one end wall of the sorting bin 103 as indicated in Fig. 1. When a compartment 103a in the collecting bin 103 is empty, such flag or plunger will be in an elevated position as in Fig. 4A, in which position it can intercept a pin 305a provided on the bell crank 305 as shown in Fig. 3A. It will be apparent that as the shuttle 104 traverses the compartments 103a in the rack of compartments 103, the flag 400 associated with the first empty slot will be intercepted by the pin 305a. Accordingly, the flag will exert a force on the bell crank 305 (Fig. 3A) which produces the necessary clockwise rotation of the bell crank to cause discharge of a letter from the shuttle into that particular compartment, the flag of which is in an elevated position.

The letter-feed mechanism 101, as is shown in Fig. 1 is at a medial position with respect to the length of each rack of sorting compartments 103. The shuttle 104, being one-half the length of each bin section, as previously indicated, can be translated from one end of the rack of sorting compartments 103 to an opposite end; in either position one of the pockets 301 in the shuttle will be in registry with the letter-feed mechanism described in connection with Figs. 2A and 2B. In other words, the shuttle 104 has two initial positions; one in which the right-hand pocket is at the middle of the sorting compartment rack 103 and the left-hand pocket is at the left side of the sorting rack; the other in which the left-hand pocket is at the middle of the sorting rack, the right-hand pocket being at the right end of the collecting bin 103. In this manner after a given traverse in which the letter has been discharged from one pocket of the shuttle into an appropriate compartment 103a in the collecting bin 103, the other pocket is automatically positioned for receiving the letter from the mechanism 101. It will be obvious that such construction precludes the need for causing the shuttle to retraverse the full length of the sorting bin 103.

A resetting cam 218 shown in Fig. 2B is employed to reset the partition 302 to its normal pocket-closing position (Fig. 3C). Such resetting cam is positioned adjacent the letter-feed station as shown in Fig. 2B and will thereby engage the pin 305a of the partition linkage 304 when either end of the shuttle is restored to an initial letter-receiving position.

*Sorting compartment and flag mechanism (Fig. 4).*— The previously referred-to rack 103 of sorting compartments 103a is shown in Figs. 1 and 2B. The rack of compartments is in the form of a bin divided into individual compartments by means of the partitions 103b. The identity of each compartment 103a can be defined by its sequential position in the rack.

The construction and operation of the flag mechanism will be apparent by considering the three consecutive operative positions of the flag mechanism illustrated in Figs. 4A through 4C. Fig. 4D is an end view corresponding to the flag mechanism when in the position of Fig. 4C. As shown in Figs. 4A through 4D the flag 400 includes an extension plunger 401 having a purality of shoulders 401a, 401b, and 401c. The flag plunger 401 is fixed to the flag 400 by means of a suitable pin 402. The flag assembly 400 is mounted for longitudinal reciprocation within a chamber 403 provided at the end of each letter-receiving compartment in collecting bin 103. A sear 404 is mounted within the chamber 403, the sear comprising a plurality of resilient fingers 404a, 404b, and 404c. The sear 404 is fixedly mounted within the chamber 403 by suitable fastenings 405. A spring 406a is nested within the chamber and seats between a shouldered portion of the flag 400 and the sear 404 as is clearly shown in Figs. 4A through 4D. The bottom end of the plunger 401 is adapted to compress a force-transmitting spring 406b. The discharge door 410 forming the bottom closure of each sorting compartment 103a is biased to a normally closed position as shown in Figs. 4A and 4B by means of a spring 402b.

Fig. 4A shows the position of the flag mechanism of an empty sorting compartment 103a in the collecting bin 103, before it is contacted by the shuttle 104 during its traverse. In such position the flag 400 is elevated and the discharge door 410 closes the bottom of the sorting compartment. The referred-to pin 305a on the bell crank 305 of the shuttle 104 described in connection with Fig. 3A is indicated in broken lines in Fig. 4A. When the shuttle 104 traverses the length of the collecting bin 103, the flag 400 of the first vacant compartment will be elevated as shown in Fig. 4A and will be contacted by the pin 305a of the bell crank. Accordingly the flag 400 together with the plunger 401 will be displaced downwardly as viewed in Figs. 4A and 4B to the position of Fig. 4B in which the spring 406a is compressed. The resilient finger 404c of the sear 404 will, in such event, engage against the shouldered portion 401b of the flag plunger 401 and hold the flag and plunger in such retracted position. It will be noted from Fig. 4B that the discharge door 410 will remain closed in a letter-retaining position. Concurrently with such downward displacement of the flag the referred-to pin 305a will cause the bell crank 305 as shown in Fig. 3A to rotate in a clockwise direction as previously described, thereby pivoting the partition 302 to a position permitting a letter carried in the pocket 301 to be discharged from the shuttle into the referred-to compartment 103a in the collecting bin 103.

In this manner a letter is transferred from the sorting station to the shuttle and from there to a first vacant slot in the sorting compartment. It will be recalled that the identity of a compartment 103a in which a letter has been deposited is transmitted as an information signal to the control mechanism of Fig. 6. Since depression of the flag 400 indicates the presence or deposit of a letter in a compartment, the resulting depression of the flag plunger is used to manifest a signal indicating the identity of the compartment in which the letter has been deposited. For this purpose a microswitch 607 is provided having an operating plunger 607a. The plunger 607a extends in the chamber 403, the end being in proximity to the underside of the flag 400 as shown in Fig. 4A. When the flag is depressed to the position of Fig. 4B, indicative of the deposit of a letter within the compartment, the microswitch 607 will be closed to transmit a signal to the control mechanism as will be described.

The means provided to produce discharge of the letters from the sorting compartment 103a upon selective actuation of a discharge control means are also shown in Figs. 4A–4D. The bottom of each of the sorting compartments in the rack or collection bin 103 is provided with a pivotally mounted discharge door 410 which normally closes the bottom of the compartment. The discharge door 410 is adapted to be opened by second plunger 407 which is operatively connected to the plunger 401 of the flag mechanism by the referred-to compressible spring 406b. It will be noted from Figs. 4A and 4B that when the flag 400 is initially depressed, the springs 406a and 406b are both compressed, the second plunger 407 not being actuated. The second plunger 407 is thus in a cocked position and subsequent release of the plunger, as will be described, will cause quick opening of the discharge door 410. The second plunger 407 is retained against movement by a second sear 408 mounted within the chamber 403. The sear 408 is secured to the second plunger 407 by a pin 408b. The sear 408 as is more clearly shown in the enlarged view of Fig. 4E is provided with a notch 408c which is normally engaged and retained by the projecting end of a pin 408a fixed in a portion of the chamber 403. The sear 408 is adapted to be actuated by the plunger 409a of a solenoid 409. When a discharge signal energizes the solenoid 409, the plunger 409a acts to shift the second sear 408 from engagement with pin 408a to the position indicated in Fig. 4C. In this position both the sear 408 and second plunger 407 are forced downwardly by the previously compressed spring 406b to quickly open the discharge door 410. A bearing plate 410a is provided on the door to receive the force of plunger 407. The bearing plate 410a also acts as a stop to limit the motion of plunger 407. A letter is thereby discharged by gravity from the sorting compartment 103a in the sorting rack 103 on to the conveyor 106 shown in Fig. 1. The solenoid 409 also concurrently actuates the spring arm 404a on the first-mentioned sear to a position in which it engages the shoulder 401a on the plunger as shown in Fig. 4C thereby holding the plunger against retraction. Subsequent deenergization of the solenoid 409 results in release of the finger 404a and the sear 408, causing the spring 402 to restore the flag to the elevated position of Fig. 4A. Since the discharge door 410 is spring biased as described, restoration of the flag mechanism to the position of Fig. 4A causes the door to close the bottom of the sorting compartment.

*Modified shuttle (Fig. 5).*—A modified form of the shuttle 104 shown in Fig. 1 for transporting a letter from the letter-feeding station to the rack of sorting compartments 103 illustrated in Figs. 5A–5C. The modified shuttle as shown in Fig. 5 includes a reciprocable carrier 500 which is disconnectably attached to cars 501, 502, one located at each end of the carrier. Referring specifically to Figs. 5A through 5C, the modified shuttle comprises a main frame 500 in the form of an elongated channel member and cars 501, 502 detachably connected to each end of the frame. Since each of the cars 501, 502 are identical in construction only car member 501 will be described in detail. The frame 500, as shown in Fig. 5C, includes a trackway or guide 503. The frame in turn is adapted to be slidably mounted lengthwise of the sorting compartment rack 103. Specifically, a channel 110 is fixed to the rack of compartments 103 and the frame 500 is slidably guided therein by means of rollers 505. Each car has the general configuration as shown in Figs. 5B and 5C and includes a letter-receiving pocket 506. Each car is slidably mounted with respect to the shuttle frame 500 as well as the main frame of the machine by means of the trolly wheels 504, 513. The trolly wheel 513 is mounted on the side of the car opposite to frame 500 and rolls on a suitable trackway provided in the rack of sorting compartments. It will be clear from the above description that the frame and cars in effect support one another, the wheel 513 on the car providing support for the frame 500.

The construction of the modified shuttle shown in Fig. 5 is such that either car 501 or 502 is detached from the shuttle frame 500 and stopped in a position whereby the pocket 506 in each car registers with a selected one of the letter-receiving compartments 103a in the sorting bin 103. The manner in which such result is obtained will now be described.

A keeper 507 is fixed to one face of the shuttle frame 500 at each end as indicated in Fig. 5A. Each car is provided with a pivotally mounted coupling latch 508 which is biased by a spring 509 into engagement with the keeper 507 as shown at the left-hand portion of Fig. 5A. When so connected, each car together with the frame 500 moves as a unit longitudinally of the sorting compartment rack 103. An uncoupling member 510 is pivotally mounted on each car as indicated in Fig. 5A and is normally biased by a leaf spring 511 to an inactive position as indicated at the left-hand side of Fig. 5A. It will be clear that pivoting of the uncoupling member 510 from the position shown at the left-hand side of Fig. 5A to the position indicated in the right-hand side of the figure results in release of the coupling member 508 from engagement with the keeper 507.

Each pocket 506 is provided with a discharge door 512 which is shown in connection with the car 501 at the left-hand section of Fig. 5A. The door 512 is spring-biased to a normally closed position in the same manner as the discharge door 410 described in connection with the modification of Fig. 4. Each of the discharge doors 512 is provided with a cam 512a which normally projects downwardly when the discharge door 512 is in a position to close off the bottom of the pocket 506, and which occupies an angled position when the door is open as indicated in connection with car 502 at the right-hand portion of Fig. 5A. Each of the unlatching members 510 is provided with a pin 510a which serves the same function as the pin 305a in connection with the shuttle modification described in Fig. 3. Specifically, the pin 510a is adapted to engage one of the upraised flags 400 provided on each sorting compartment 103a.

When the pin 510a is engaged by an upraised flag as the shuttle assembly traverses the length of the rack of sorting compartments 103, it will be clear that the coupling member 508 is released thereby disconnecting the car from the shuttle frame 500. When either of the cars is released by the described action of the flag in releasing the coupling member 508, the frame 500 of the shuttle slides past the car. For example, if the car on the left-hand side of the frame 500 were uncoupled as viewed in Fig. 5A, the frame together with the keeper 507 would slide to the left of the car. Accordingly, when the shuttle is reciprocated back the now-released coupler member 508 will engage the keeper 507 and pick up the car. When the latch releasing member 510 is pivoted due to its engagement with one of the flags, the pin 510a is also adapted to press against the cam 512a and thus rotate the discharge door 512 to an open position enabling a letter carried in the pocket 506 to be discharged into the sorting compartment 103a, which is in registry with that pocket.

It will be clear that the guide rollers 504 attached to each car are not disengaged from the guide channel 503 in shuttle frame 500. The car therefore serves to support the frame 500 regardless of whether the car is coupled or uncoupled to the shuttle frame.

It will be clear from Fig. 5A, that the leaf spring 511 normally biases the release member 510 to the position shown at the left of the figure. Accordingly, when the shuttle frame 500 is reciprocated back to a letter-receiving position, the coupler 508 will be in a position to engage with a keeper 507. The cars 502 are accordingly automatically recoupled to the frame when either end of the carriage is restored to letter-receiving position. Suitable stops 520, 521 are mounted on each end of the shuttle frame to confine car-travel within the length of the shuttle frame.

It will be noted from Fig. 5A that ends of the coupler members 508 are aligned. When one of the cars has been detached from the carriage frame 500 at a sorting compartment located near the midpoint of the rack or sorting compartments, the remaining car will be carried by the frame so as to interfere with the detached car. Should such conditions arise, the referred-to-alignment of the coupler members 508 will cause actuation of the coupler member of the detached car to release it from engagement with the sorting compartment. The time interval before such engagement of the coupler members is sufficient to permit discharge of a letter from the pocket 506 into a sorting compartment.

Control of the above-described mechanisms is achieved through a system of control circuitry as illustrated in Figs. 6, 7, 9A and 9B now to be described.

*Article characteristic information registering system (Fig. 6).*—The control mechanism for sorting out the letters from the bin 103 in destination groups is based upon registration of article characteristic information signals generated during a sorting operation as illustrated in Fig. 6 of the drawings. The compartment unloading solenoids 409 described in connection with Figs. 4A through 4D which initiate discharge of a letter from a particular compartment in the bin 103 are indicated in Fig. 6 at the upper right-hand portion of the diagram. A control system involving only four of the sorting compartments 103a (Fig. 1) is illustrated in Fig. 6 for purposes of simplicity. It will be understood, however, that the same principles governing the control of four compartments are applicable to as many compartments as is required in a particular installation.

The destination or article characteristic keys on the keyboard control 100 of Fig. 1 are designated as destination keys 601A, 601B, 601C, 601D, and 601E in Fig. 6. It will be understood that each key corresponds to a particular geographical destination or other singular characteristic of the articles being sorted. While a single key is employed to designate a particular geographical destination in connection with Fig. 6, it will be understood that in order to cover a large variety of geographical destinations, combinations of keys grouped according to predetermined codes may be employed to increase the capacity of the machine. Each destination key 601A through 601E is connected to a respective slot synchronizing relay 630A through 630E. The slot synchronizing relay is a conventional electromagnetic relay employed to repeat the signal initiated by depression of the selected destination key 601. The specific details of the relay circuitry employed is shown in Fig. 9 to be described.

A matrix comprising a plurality of logical and-gates 602—606 arranged according to vertical and horizontal groupings as clearly indicated in Fig. 6 is employed to determine coincidence between the signals provided by the destination keys 601A through 601E and the compartment identification signals obtained from the loading indicator switch 607 in each sorting compartment 103a. Such switch, it will be recalled, is actuated when a letter has been deposited in a particular one of the compartments 103a in the rack of sorting compartments 103.

Five horizontal groups of and-gates 602—1 to 602—4, 603—1 through 603—4, 604—1 through 604—4, 605—1 through 605—4, and 606—1 through 606—4 are indicated in Fig. 6 to show the manner in which any number of selection keys can be correlated with a limited number of sorting compartments represented in Fig. 6 by the unloading solenoids 409—1 to 409—4. Each group of and-gates corresponds to a particular one of the sorting compartments 103a. The and-gates are conventional coincidence devices such as are commonly employed in connection with data processing equipment. The construction and operation of a typical logical and-gate circuit is described on page 397 through 400 of "Pulse and Digital Circuits" by Millman and Taub published by McGraw-Hill. Briefly, an and-gate will transmit an output signal when and only when two or more input signals are applied thereto. In other words, the and-gate 602—1 shown in Fig. 6 will transmit an output signal to the compartment destination memory relay bank 611 when and only when a signal is applied from slot synchronizing relay 630A coincidentally with a signal from the slot-loading indicator switch 607—1. The loading-indicator switches 607—1 through 607—4 correspond to the microswitches shown in Figs. 4A through 4D which are actuated when a letter is deposited from the shuttle into one of the compartments 103a in the receptacle 103. It will be noted from Fig. 6 that each loading-indicator switch such as 607—1 is connected to a vertical array of logical and-gates 602—1 through 606—1. The loading-indicator switches 607—2 through 607—4 are similarly connected respectively to vertical arrays of and-gates as indicated in Fig. 6. The described arrangement of and-gates therefore results in a selection matrix in which only one of the and-gates will be rendered conducting when a particular destination key 601 is actuated to place a letter in a sorting compartment 103a.

The output of each logical and-gate 602—606 is connected to a respective relay 611A$_1$ etc. in a destination memory relay bank 611. Each relay is identified by the designations A$_1$—E$_4$ corresponding to each of the horizontal groups of and-gates, respectively. The output of each of the relays in the relay bank 611A$_1$ through 611E$_4$ is connected to respective second logical and-gates 616 through 620 as shown in Fig. 6. The second logical and-gates are arranged according to horizontal groupings 616—1—616—4, 617—1—617—4 etc. corresponding, respectively to each group of said first and-gates. The second inputs to the and-gates 616 through 620 are obtained from the contacts of a programming switch SW600. The outputs from the second logical and-gates 616 through 620 are channeled according to the pattern indicated in Fig. 6 to a group of four logical or-gates 621 through 624. The logical or-gates are conventional devices such devices such as described in pages 394 through 396 of the above-referred-to text. Briefly, a logical or-gate will transmit an output signal when any one or more of its input terminals are energized.

The construction and operation of the control circuit of Fig. 6 can readily be understood by considering a typical sorting operation. When a destination key 601 on the keyboard 100 at a sorting station is depressed according to a designated address or other characteristic of an article, it causes an associated synchronizing relay 630A to apply an energizing signal to all of the and-gates in a respective one of the first and-gate groups such as 602—1 through 602—4 in Fig. 6. As previously indicated, the and-gates 602—1 through 602—4 are arrayed according to a pattern wherein each of the destination keys 601 is connected to a respective group of horizontally arranged and-gates and each loading-indicator switch is connected to one of the and-gates in each such group.

It will be recalled that depression of a selected destination key 601 results in the deposit of a letter (1) into a pocket of the shuttle 102 followed by (2) automatic traverse of the shuttle 102 and consequent discharge of a letter from the shuttle into the first encountered vacant compartment 103a in the sorting rack 103.

As such vacant compartment is loaded, the corresponding loading-indicator switch designated as 607—1 in Fig. 6 provided in the mechanism of Figs. 4A through 4D, as previously described, is closed to transmit a signal to a vertical row of and-gates 602 through 606 of Fig. 6.

A particular one of these and-gates will therefore respond to coincidence between a signal from one of the destination keys and an appropriate one of the loading-indicator switches. Accordingly, an output signal from such selected and-gate will be transmitted to one of the relays in the relay bank 611. The relay bank comprises a conventional bistable type of relay or equivalent electronic circuit which is commonly employed in data processing systems. A typical relay suitable for such purpose is shown in connection with the modified control circuit of Figs. 9A, 9B. When energized, such device assumes one of two states or conditions and the character of such assumed state corresponds to the registration or memorizing of a "bit" of information. It will be apparent that the memorized information will pertain to the identity of a sorting compartment 103a containing a letter of a particular address. Accordingly, the relay bank 611 functions as a compartment-destination memory register since it in effect memorizes the particular slot or compartment 103a in the rack 103 of Fig. 1 in which a letter corresponding to the destination key 601 has been deposited.

The referred-to destination unloader-stepping switch SW600 as shown in Fig. 6 is provided with contact pairs labeled A through E. One of each contact pair is connected as indicated by the solid line connections in Fig. 6 to a particular horizontal group of the second logical and-gates 616 through 620. The other contact of each contact pair is connected as indicated in broken lines in Fig. 6 to an appropriate group of the slot destination memory relay bank 611. The destination unloader-stepping switch SW600 merely exemplifies a particular type of programming device which can be employed to either manually or automatically unload the sorting compartments 103a of Fig. 1. The angular position of the wiper arm of the switch SW600 in relation to the contact pairs corresponds to a particular destination or address. The contact pairs are labeled A through E corresponding to the destinations symbolized by the destination keys 601A through 601E.

One input of the second group of logical and-gates 616 through 620 will be energized by one of the relays in the memory relay bank 611 corresponding to the particular destination key 601 actuated. In other words, one input of the and-gates 616 through 620 will have been readied by a signal corresponding to the identity of a slot or compartment 103a containing a letter of a particular geographical address. The wiper arm of the switch SW600 will then function to selectively discharge all compartments having such common address. For example, in the particular example previously given, destination key 601A corresponds to New York and slots 1 and 3 of the compartment 103a will therefore contain letters addressed to New York. Similarly key 601B will designate letters for the State of Illinois and the second compartment in the sorting bin 103 will contain a letter for such destination. Similarly, a letter for California will have resulted in depression of key 601C and the occupancy of a fourth compartment in the rack 103.

In other words, during the process of sorting letters having a New York destination, for example, letters will have been deposited in slots identified as Nos. 1 and 3, destination key 601A will have been actuated and loading-indicator switches 607—1 and 607—3 in compartments 1 and 3 will be energized. It will be apparent by following the diagram of Fig. 6 that logical and-gates designated 602—1 and 602—3 will have been rendered conducting to store an information signal in relays 611A$_1$ and 611A$_3$ of the slot destination memory relay bank 611.

By a similar analysis it will be clear that an information signal will have been registered in memory relay 611B₂ for letters corresponding to Illinois. Likewise slot destination memory relay 611C₄ will have been energized for a California letter.

If it is desired to discharge letters having a New York destination, the wiper of switch SW600 will be positioned to contact A. Since the secondary group of logical and-gates 616—1 and 616—3 will have been readied as a result of a signal from the slot destination memory relay, when the wiper arm of the destination unloader stepping switch SW600 closes with contacts A, such and-gates will be rendered conducting and a signal will therefore be transmitted through or-gates 621 and 623 to energize the slot unloading solenoids 409—1 and 409—3 which in the manner described in Figs. 4A through 4D will cause discharge of a letter from the corresponding compartments 103a in the sorting bin 103. The New York letters will accordingly be discharged en masse onto the conveyor belt 106 as shown in Fig. 1 and carried away for proper distribution.

To obtain discharge of letters having an Illinois address the wiper arm of switch SW600 will similarly be positioned to contacts B of the switch SW600 causing logical and-gate 617—2 to energize the unloading solenoid 409—2 through or-gate 622. In a like manner positioning of the wiper arm of switch SW600 to contact C will cause and-gate 618—4 to be rendered conducting and produce actuation of slot unloading solenoid 409—4. The destination unloader stepping switch SW600 can obviously be operated automatically according to a programmed sequence. For example, depending on the particular load conditions at an installation, it may be found desirable to repetitiously discharge letters to New York in rapid sequence by positioning the wiper arm on contacts A and only intermittently discharge of letters to other less voluminous destinations. The flexibility offered by the article sorting machine of the present invention with such respect is apparent. Specifically, a sorting slot of compartment 103a does not have to be provided for every known geographical address. A limited installation having a fixed number of sorting slots can be employed regardless of the volume of distribution to be handled, since the machine can readily be emptied by the destination unloading-stepping switch as frequently as the load demands.

It will be noted from Fig. 6 that the second contact of each contact pair comprising switch SW600 is connected, as indicated by the broken line connection to each relay group in the memory relay bank 611. Specifically, the second contact of contact pair A in SW600 is connected to relay group 611A₁—611A₄; the second contact of contact pair B is connected to relay group 611B₁—611B₄ etc. Such connections serve to reset the relay bank comprising the memory register. Means are provided for resetting the synchronizing relay 630A etc. when a memory relay 611 is energized as will be disclosed in greater detail in connection with the description of Fig. 9A. The resetting mechanism is symbolically indicated by the broken line connection 631 in Fig. 6.

Figs. 9A and 9B show a modified control circuit of the same type as Fig. 6 but which employs only electromagnetic elements for the control mechanism. Only a portion of the circuit elements is illustrated in the modification Fig. 9A since the over-all system will be clearly understood from Fig. 6 as previously described.

In Fig. 9A the elements corresponding to the elements of Fig. 6 bear like designations. Two of the destination keys provided on the keyboard 100 are indicated in Fig. 9A; namely, keys 601A and 601B. The adjacent synchronizing relay; namely, 630A and 630B are also indicated in Fig. 9A adjacent the destination keys. In lieu of the logical coincidence gates 602 etc. employed in the modification of Fig. 6, the embodiment of Fig. 9A employs a circuit including the synchronizing relays to identify a particular sorting compartment with the characteristic of the letter deposited therein.

Loading-indicating switches 607—1 and 607—2 as well as compartment-unloading solenoids 409—1 and 409—2 are also indicated in Fig. 9A. The memory relays 611A₁, 611B₁ etc. shown in modification of Fig. 9A have a contact arrangement which is shown in enlarged form in Fig. 9B. Fig. 9B also clearly indicates the sequence of operation of the relay contacts.

The construction and operation of the modified control circuit of Fig. 9A will best be understood by considering a representative sorting operation. When a destination key 601A is momentarily closed the solenoid of synchronizing relay 630A will be energized from the positive source indicated through the solenoid coil and to the negative side of the line. The resulting energization of the solenoid of relay 630A causes the associated contacts of the relay; namely, 630A₁ and 630A₂ to close. Contact 630A₁ completes a holding circuit for the solenoid winding which can be traced from the negative side of the line through the solenoid winding through contact 630A₁ through the normally closed contacts 2 of the memory relay 611A₁, memory relay 611A₂ and to the positive side of the line. Closing of the contact 630A₂ of the synchronizing relay 630A readies a circuit from the positive line through contact 630A₂ to the contacts 1 of the memory relay 611A₁. The latter contacts are normally open as indicated in Fig. 9A. Consequent to actuation of a destination key, it will be recalled that a letter will be transferred by the shuttle 102 into an appropriate vacant sorting compartment 103a and an associated loading switch such as 607—1 shown in Fig. 9A will be closed. Accordingly when the loading switch 607—1 is closed an energization circuit is established from the negative side of the line through loading switch 607—1 through the solenoid winding of the memory relay 611A₁ through the now closed contact 630A—2 of the synchronizing relays 630A and thence to the positive side of the line. In other words, energization of any one of the memory relays 611A₁, 611A₂ according to the modification shown in Fig. 9A requires the cojoint application of a signal from the synchronizing relay 630A and from the appropriate loading switch 607—1 or 607—2.

The circuitry for the memory relay therefore corresponds in function to the coincidence gates previously described in connection with the modification of Fig. 6. In any event the resulting energization of the memory relay 611A₁ causes actuation of the various contacts 1 through 4 according to the pattern clearly identified in the chart of Fig. 9B. Specifically, when contact 2 of the memory relay 611A₁ is opened it breaks the hold circuit including contact 630A₁ of the synchronizing relay 630A, thereby resetting the relay 630A which was previously energized. The switching of the line from contact 2 to contact 3 reestablishes a holding circuit from the positive line through contact 630A₁ and the coil of the synchronizing relay 630A to the negative line upon a repeat of actuating destination key 601a. Closing of contact 4 establishes a circuit path from one of the contacts of the stepping switch SW600 to the slot unloading solenoid, such as 409—1. It will thus be clear that the identity of a sorting compartment together with the identity of a letter deposited therein will have been stored in accordance with the modification of Fig. 9A in a manner similar to that described in the embodiment of Fig. 6. It will also be clear from Fig. 9A that actuation of the stepping switch SW600 will produce energization of the compartment unloading solenoid such as 409—1 to discharge a letter from the compartment. Upon occurrence of such discharge the loading switch SW607—1 will be opened to deenergize memory relays readying the circuit for a subsequent operation.

It will be apparent that the construction of the article-discharge control circuits shown in Figs. 6 or 9 permits integration of as many individual sorting mechanisms as is needed into a single sorting system. That is, such control circuits may be connected to actuate the discharge mechanisms of the sorting compartments 103a in any number of sorting machines. In this manner the sorting machines may readily be compounded into various series or series-parallel patterns with respect to a common conveyor or discharge output such as 106 (Fig. 1) to effect a sorting system most efficacious with the load demands. Fig. 1 shows the control circuit of either Figs. 6 or 9, designated as 600, operatively associated with a number of sorting machines. A common discharge receiving means in the form of a conveyor 106 being employed to collect the sorted articles of like characteristic as discrete categories. It will be clear from a consideration of the control circuits of either Figs. 6 or 9, that articles of like categories will be discharged, regardless of the differences in identity between the compartments in the various machines in which articles of like category characteristics have been deposited.

The mechanism for translating a letter from the hopper 102 to the shuttle has been described in connection with Figs. 2A–2C. The means for motivating the letter-feed mechanism and the shuttle will now be described.

Figure 7:
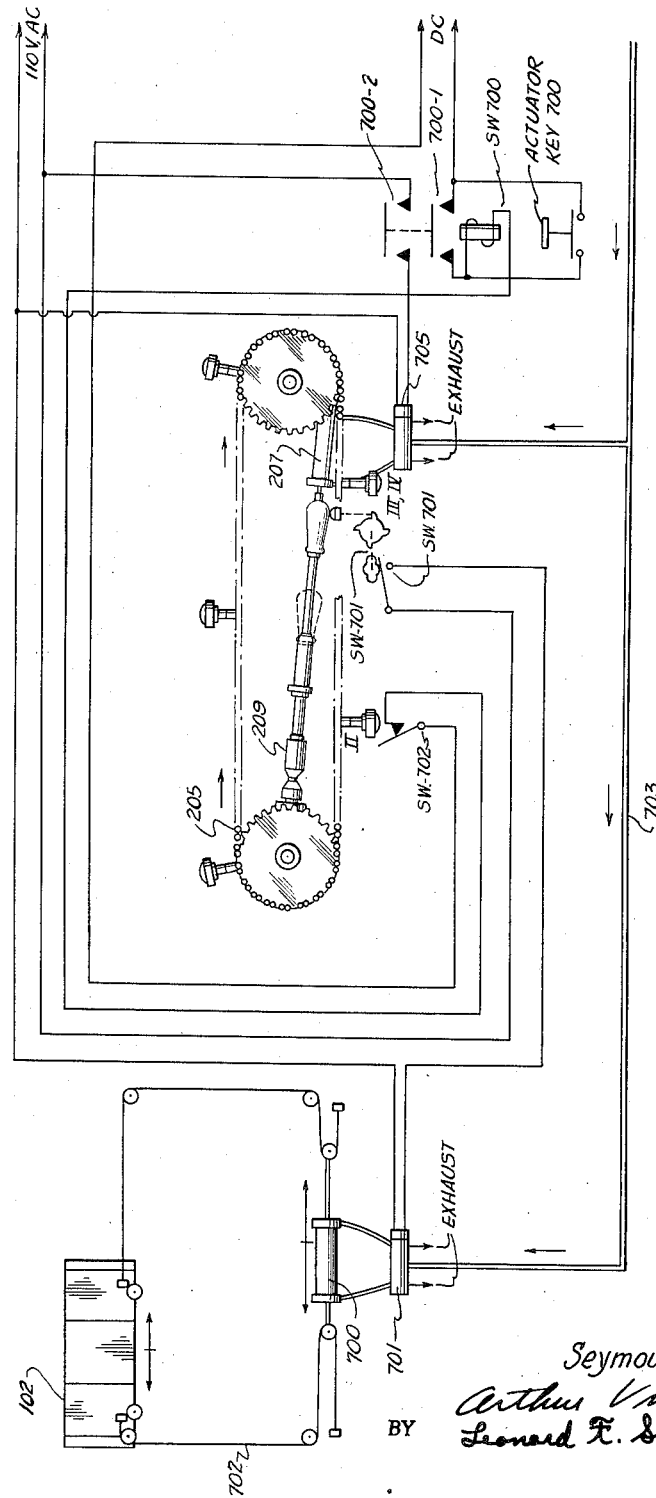
Fig. 7 is an electro-mechanical schematic of the article-feed and shuttle operating mechanism.

The specific manner in which an article such as a letter is transported to the various index positions designated in connection with Fig. 2 and the manner in which the shuttle 102 is actuated is illustrated in the mechanical and electrical schematic diagram of Fig. 7.

The actuator key provided on the keyboard 100 shown in Fig. 1 which is depressed each time a selection key is actuated comprises a relay switching device designated as SW700 in Fig. 7. Actuation of the key 700 results in a translatory movement of the referred-to letter-feed belts 205 described in connection with Fig. 2 and initiation of the shuttle 102 by the mechanism now to be described.

The air cylinder 207 which actuates the indexing mechanism 209 described previously in connection with Fig. 2 is shown in Fig. 7 as being connected to a standard four-way pilot-operated A. C. solenoid pneumatic valve 705. The shuttle 102 previously described in connection with Figs. 1 and 2 is caused to reciprocate with respect to the rack of sorting compartments 103a by means of a harness belt arrangement 702 connected as clearly indicated in Fig. 7 to a double-ended piston rod air cylinder 700. The air cylinder 700 is controlled by a standard four-way pilot-operated A. C. solenoid actuated valve 701. Both the control valves 701 and 705 are connected by means of an air line 703 to a source of compressed air, not shown.

When the actuator key 700 is momentarily depressed it first completes a hold circuit comprising contacts 700—1 of the relay SW700. The consequent closing of contacts 700—2 completes a circuit from the 110-volt source through the A. C. solenoid of the four-way pilot-operated valve 705. The air line 703 is accordingly connected to the indexing mechanism air cylinder 207 which functions to translate the belt 205 a distance corresponding to the distance, for example, between positions I and II as indicated in Fig. 2A. Referring to Figs. 2A and 2B, it will be clear that such movement results in the indexing of a letter from the supply hopper 102 to position II; an adjacent letter from position II to position III; and still another letter from position IV to position V; and another letter from position V to position VI. The indexing mechanism 209 is arranged to actuate a push-on—push-off switch SW701 each time it is driven by the air cylinder 207. The switch SW701 forms an energizing circuit for the solenoid of the four-way pilot valve 701 associated with the shuttle operating mechanism 700, 702. When the switch SW701 is closed for example, the resulting energization of the solenoid of the four-way valve 701 causes the piston of air cylinder 700 to translate the shuttle 102 in a first-direction across the row of sorting compartments 103a. During the next actuation of the indexing mechanism 209, the resulting opening of the switch SW701 deenergizes the solenoid of the valve 701 and causes the piston of the double-ended cylinder 700 to shift the shuttle 102 in an opposite direction. During each such indexing movement, it will be apparent from Fig. 7 that normally closed switch SW702 is momentarily opened to deenergize the hold circuit for relay SW700.

In this manner, the previously described reciprocation of the shuttle 102 relative to the letter-feed station (Fig. 1) is achieved.

The over-all operation of the sorting mechanism can be reviewed with the aid of the timing diagram illustrated in Fig. 8. Fig. 8 shows the sequence of operations covering a plurality of letters designated as A through G. Each of the letter-station positions identified in connection with Figs. 2A and 2B are indicated in Fig. 8 as the first five operations enumerated in the vertical column at the left-hand side of the figure. Time in seconds is indicated in a horizontal direction.

As indicated in Fig. 8, the first seven letters A through G will be removed from the supply hopper 102 (Fig. 2A) in sequence at time intervals of approximately 7/10 of a second. Considering the first letter designated as A, it will be clear from Fig. 8 that the letter is indexed from station position I to station position II in approximately 1/10 of a second as indicated by the sloping line between stations I and II. Similarly, each of the letters B through G will be transported from positions I to II in a like time interval. The letters are then indexed in sequence from station position II to station position III and from station position III to station position IV in the time inerval indicated in Fig. 8. At station V it will be observed that the letter is held for an interval of approximately 9/10 of a second. The short time interval between positions III and IV is indicative of the interval during which a letter drops from the upper track 203 of Fig. 2A to the lower track 204.

The letter is inspected by the operator at station position V and sufficient time is allowed for the operator to enter the address selector keys 601 and the actuator bar 700.

It will be apparent from the timing diagram of Fig. 8 that the cycle of operation of the sorting machine is nonsynchronous.

Specifically, while a letter is at the inspection position V, the feed cycle is latent until actuated by depression of the actuation bar 700 on the keyboard mechanism.

After inspection by the operator, the letter is indexed to position VI where, as will be apparent from Fig. 2A, the letter is deposited in the pocket at either end of the shuttle 102.

The remainder of the timing diagram indicates the sequencing of the shuttle mechanism. If the letter had been deposited in one end of the shuttle (designated in the timing diagram as "Pocket No. 1, Shuttle End No. 1") then the sequencing of the shuttle is indicated by the inverted trapezoidal-shaped curve; similarly, if the shuttle were in a position to receive a letter in the opposite end of the shuttle (designated as "Pocket No. 2, Shuttle End No. 2") in the timing diagram, the sequencing of the shuttle mechanism is indicated by the upright trapezodal curve.

It will be apparent from the above description of a sorting mechanism that the invention achieves a significant reduction in the number of destination repositories normally required in any given sorting operation. The flexibility permitted by the labeling of the slots in accordance with a letter deposited therein together with the correlation of information concerning the slot identity and the occupancy thereof in a memory register, enables a limited sized unit to accommodate virtually an unlimited number of destination categories.

It will be obvious that the mechanism comprising the present invention is also readily adaptable to more highly refined automation techniques. For example, by employing electronic reading of the address, it is obvious that the keyboard mechanism or memory register can be automatically controlled by the output of a particular electronic reading device.

Discharge of the letters from the sorting compartments 103a and the collecting bin 103 can also be modified so that a delay can be provided between opening of each of the discharge doors. In this manner it is possible to deposit the letters in stacked bundles directly on the conveyor with the consequent saving of time required to separately stack and bundle the letter.

It will be apparent also that the article sorting mechanism comprising the present invention collaterally achieves justification of the letters handled. Since a letter when deposited in a sorting compartment is oriented with the address in a particular direction it will be obvious that such orientation of the letter will be preserved when it is deposited on the conveyor. Accordingly, a considerable saving of time is achieved by having the sorted letters oriented automatically.

The advantages offered by the article sorting mechanism of the present invention can now be summarized. With reference to the letter-feed cycle described in connection with Figs. 4 and 8, it will be apparent that since a nonsynchronous cycle of operation is employed, the operator at each station is in complete control of the reading time and letter-feed indexing. Accordingly, misses or errors in article or letter sorting is completely minimized.

It will also be apparent from the description of the invention that the machine has sufficient flexibility in physical characteristics to permit sorting procedures based on logical order such as alphabetical, numerical, or route sequence in addition to predetermined destination sorting.

The relation of a plurality of sorting machines of the type described in connection with a single output conveyor enables the combining of any desired or practicable number of sorting machines into a sorting system with a single output. Moreover, since the logical control circuits illustrated in Figs. 6 and 9 may be connected to any number of individual sorting machines, it will be apparent that the compounding of the machines in a common conveyor system results in an integrated sorting system.

It will be apparent that the embodiments shown are only exemplary and that various modifications can be made in construction and arrangement within the scope of invention as defined in the appended claims.

What is claimed is:

1. A mechanism for segregating randomly arranged articles according to predetermined groups corresponding to a characteristic common to each group comprising: a plurality of sorting compartments, means selectively actuated according to said characteristics for transporting articles from a supply source to each of said compartments in sequence, means in said compartments responsive to deposit of an article therein for generating a compartment identifying signal, first coincidence means jointly responsive to said selectively actuated means and said compartment identifying signals for generating article location control signals, means for storing said control signals, adjustable group characteristic selection means, and second coincidence means jointly responsive to said control signal storing means and a selected adjustment of said group selection means for generating an article discharge control signal and means responsive to said article discharge control signal for discharging articles from said sorting compartments according to a desired group characteristic.

2. The invention of claim 1 in which said sorting compartments comprise a rack of sequentially arranged slots and in which said article supply source is positioned medially with respect to the length of said rack.

3. The invention of claim 2 in which said article transporting means includes a cyclically operated shuttle for traversing all of said sequentially arranged sorting compartments during each cycle of operation, and means responsive to the condition of occupancy of a compartment for transferring an article from said shuttle to said compartment.

4. The invention of claim 3 in which said shuttle comprises movable article retaining means, and in which said article transferring means includes a positionable element in each of said sorting compartments, means for retaining said positionable element in a first position of interception with said article retaining means when said compartment is vacant and means operable by said article retaining means during shuttle traverse for displacing said positionable member to an inactive position.

5. The invention of claim 4 including means actuated by said article discharge means when energized for restoring said positionable means to said first position.

6. The invention of claim 4 in which said shuttle includes an article retaining means at each end, the length of said shuttle corresponding to one-half the length of said rack and in which said shuttle moves from a position in which either of said retaining means is aligned with said article supply source during each of said cycles of operation.

7. A mechanism for segregating randomly arranged articles according to predetermined groups corresponding to a characteristic common to each group comprising: a sorting station including an article supply source and a selectively actuable keyboard mechanism at such sorting station, a plurality of sequentially arranged sorting compartments, a cyclically operated shuttle having a traverse path between said supply source and all of said compartments during each cycle of operation, means controlled by said keyboard for sequentially transferring a letter from said supply source to said shuttle and means also responsive to said keyboard control means for cycling said shuttle.

8. In an article sorting system, a plurality of sorting compartments adapted to receive articles, means for cojointly registering information signals corresponding to the characteristics of an article deposited in each of said sorting compartments and the identity of the compartment in which such article has been deposited, said registering means comprising a matrix circuit having a plurality of responsive means arranged in separate groups, a first group of said responsive means being energized by signals corresponding to said compartment identity information and a second group of said responsive means being energized by signals corresponding to said article characteristic.

9. The invention of claim 8 including means for selectively discharging articles from each of said compartments and discharge determining means connected to each of said responsive means for selectively actuating said discharge means.

10. In an article sorting system having a plurality of article sorting compartments, a control circuit for correlating the identity of a particular compartment with a predetermined characteristic of an article deposited into said compartment comprising: a circuit matrix having a plurality of signal responsive coincidence means arranged according to a rectilinear coordinate array of rows and columns, selectively operable means connected respectively to groups of rows of responsive means for applying an article characteristic energizing signal to corresponding rows of said responsive means, means connected respectively to each column of responsive means and responsive to the occupancy of said compartments by an article for applying a compartment identity energizing signal to a selective column of said responsive means whereby concurrence of said two applied energizing signals is manifested by energization of a single one of said signal responsive means and signal registering means connected to each of said rows of responsive means.

11. The invention of claim 10 in which the number of rows of said signal responsive means in each group corresponds to the number of sorting compartments.

12. The invention of claim 11 in which said signal responsive coincidence means comprises a signal coincidence device for providing an output signal only when energized by a plurality of applied input signals.

13. The invention of claim 12 including second signal responsive means connected respectively to the signal registering means in each row of said first signal responsive means.

14. The invention of claim 13 in which each of said second signal responsive means is a coincidence device for providing an output signal only when energized by a plurality of signals and means for selectively applying a second article characteristic energizing signal to each of said second signal responsive means.

15. The invention of claim 14 including article discharge means in each of said sorting compartments and a second circuit matrix connecting each of said second signal responsive means corresponding to each of said defined groups respectively to all of said article discharge means.

16. A mechanism for segregating randomly arranged articles according to predetermined groups corresponding to a characteristic common to each group comprising: a plurality of sequentially arranged sorting compartments, means selectively actuated according to a particular characteristic for depositing an article in said compartments, means in each of said compartments for generating a compartment identification signal upon receipt of an article therein, register means articulated with said selectively actuated means and said compartment identification signal generating means for correlating the identity of each compartment together with the characteristics of the article deposited therein, article discharge means in each compartment and discharge control means connected to said register for selectively energizing said article discharge means.

17. In an article sorting system having a rack of serially arranged sorting compartments, positionable indicating means in each compartment and an article supply source arranged medially with respect to the length of said rack, a shuttle mechanism for transferring articles from said source to said compartments upon selective energization of a control means comprising: a carriage having an article carrying pocket at each end adapted to register with each of said sorting compartments for receiving articles from said source, means energized by said control means for translating said carriage across the extent of said rack of sorting compartments, article discharge means in each of said pockets and means in each pocket responsive to said positionable means consequent to translatory movement of said carriage for actuating said article discharge means.

18. The invention of claim 17 in which the carriage pockets are spaced relative to each other a distance equal to one-half the length of the rack of slots, said carriage being normally positioned with one of said pockets aligned with said supply source.

19. The invention of claim 18 in which said discharge means comprises a pivoted closure member for said pocket and a linkage in the path of said positionable means for pivoting said closure member.

20. The invention of claim 19 in which said shuttle carriage comprises a frame, means slidably mounting said frame on said rack of compartments, and in which each of said pockets comprises a car, means slidably mounting each of said cars on said rack and carriage frame respectively, means normally coupling each of said cars to said frame and means responsive to said compartment positionable means for disconnecting said coupling means consequent to translatory movement of said carriage.

21. The invention of claim 20 in which said coupling means comprises a coupling latch secured at each end of said carriage frame, a keeper on each car, means normally connecting said latch to said keeper, a release member on said carriage adjacent to each coupling latch and means on said release member co-operable with said positionable means for disconnecting said latch from said keeper.

22. The invention of claim 21 including a closure member for each car pocket and means connected to said release member for opening said closure member.

23. A sorting system for segregating articles into discrete categories comprising: a plurality of sorting stations in which each station comprises a plurality of storage compartments and means for separately depositing an article in each compartment, means connected to each station for cojointly registering the category characteristic of such article together with the identity of the compartment in each station in which such article has been deposited, control means articulated with said register means for selectively discharging articles having a common category characteristic from compartments in all of said stations identified with such selected articles and means common to all of said stations for collecting said discharged articles upon energization of said discharge means, as discrete categories.

References Cited in the file of this patent

FOREIGN PATENTS 741,124     Great Britain _____ Nov. 30, 1955